US008717149B2

(12) United States Patent
Gude et al.

(10) Patent No.: US 8,717,149 B2
(45) **Date of Patent: *May 6, 2014**

(54) REMOTE-CONTROL DEVICE WITH DIRECTIONAL AUDIO SYSTEM

(71) Applicant: Broadcom Corporation, Irvine, CA (US)

(72) Inventors: Dasaradha Gude, Banjara Hills (IN); Gunjan Porwal, Banjara Hills (IN); Murli Krishna Kocherla, Banjara Hills (IN)

(73) Assignee: Broadcom Corporation, Irvine, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/958,766

(22) Filed: Aug. 5, 2013

(65) Prior Publication Data

US 2013/0314218 A1 Nov. 28, 2013

Related U.S. Application Data

(63) Continuation of application No. 11/839,798, filed on Aug. 16, 2007, now Pat. No. 8,502,648.

(51) Int. Cl.
*G05B 11/01* (2006.01)

(52) U.S. Cl.
USPC .......... 340/12.22; 381/77; 367/138; 181/142; 181/175

(58) Field of Classification Search
USPC .......................... 340/12.22; 341/176; 381/77
See application file for complete search history.

(56) References Cited

U.S. PATENT DOCUMENTS

| | | | |
|---|---|---|---|
| 5,189,517 | A | 2/1993 | Ohara |
| 5,532,438 | A | 7/1996 | Brown |
| 7,023,499 | B2 | 4/2006 | Williams et al. |
| 2002/0111795 | A1 | 8/2002 | Norris et al. |
| 2002/0111798 | A1 | 8/2002 | Huang |
| 2004/0003073 | A1 | 1/2004 | Krzyzanowski et al. |
| 2004/0199534 | A1 | 10/2004 | Juszkiewicz |

*Primary Examiner* — Daniel Wu
*Assistant Examiner* — Frederick Ott
(74) *Attorney, Agent, or Firm* — Foley & Lardner LLP

(57) ABSTRACT

A method of directing an audio signal to an intended user by a remote-control device coupled to an audio/video device is described. The remote-control device sends an instruction to the audio/video device to transmit an audio signal. The remote-control device receives the audio signal and processes the audio signal to generate a directional audio. The directional audio is then routed to an intended user such that the directional audio signal is audible to the intended user, but not to other recipients in the vicinity.

20 Claims, 2 Drawing Sheets

REMOTE-CONTROL DEVICE WITH DIRECTIONAL AUDIO SYSTEM

CROSS REFERENCE TO RELATED APPLICATIONS

This application is a continuation of co-pending U.S. patent application entitled "REMOTE-CONTROL DEVICE WITH DIRECTIONAL AUDIO SYSTEM" having Ser. No. 11/839,798, filed Aug. 16, 2007, the entirety of which is hereby incorporated by reference.

FIELD OF INVENTION

The present application relates to an audio/video devices such as televisions, radios, DVD players, etc. that can direct an audio signal to intended recipients.

BACKGROUND

Audio/video devices such as televisions, music systems, home theaters, radios, transistors, DVD players, VCRs, etc. typically use one or more speaker(s) to transmit sound. Most of these audio/video devices are operable using a remote control. Typically, the sound produced by the speakers in these devices is audible to all persons in the vicinity of the devices. In case a listener does not desire to hear the sound, he has to relocate himself to a place where it is not audible. Also, if a listener desirous of hearing the sound is mobile, it is possible that he may move out of the coverage area of the speakers, resulting in the audio becoming inaudible to him. Therefore, there is a need for controlling the manner in which the sound is transmitted, so that the sound is audible to those who desire to listen to it even when they move out of the coverage area of the speakers, and at the same time disturbance to other persons not desirous of hearing the audio is avoided.

SUMMARY

This summary is provided to introduce concepts relating to directing audio to intended recipients. These concepts are further described below in the detailed description. The presented summary is not intended to identify essential features of the claimed subject matter, nor is it intended for use in determining the scope of the claimed subject matter.

In view of the above, a remote-control device instructs an audio/video device to direct an audio signal to the remote-control device. The remote-control device receives the audio signal and processes the audio signal to generate directional audio using one or more audio generating devices integrated with the remote-control device. Furthermore, the audio generating device(s) send the directional audio to an intended user so that the directional audio is audible to the intended user, but not to other recipients in the vicinity.

BRIEF DESCRIPTION OF THE DRAWINGS

The detailed description is described with reference to the accompanying figures. In the figures, the left-most digit(s) of a reference number identifies the figure in which the reference number first appears. The same numbers are used throughout the drawings to reference like features and components.

DETAILED DESCRIPTION

Figure 1:
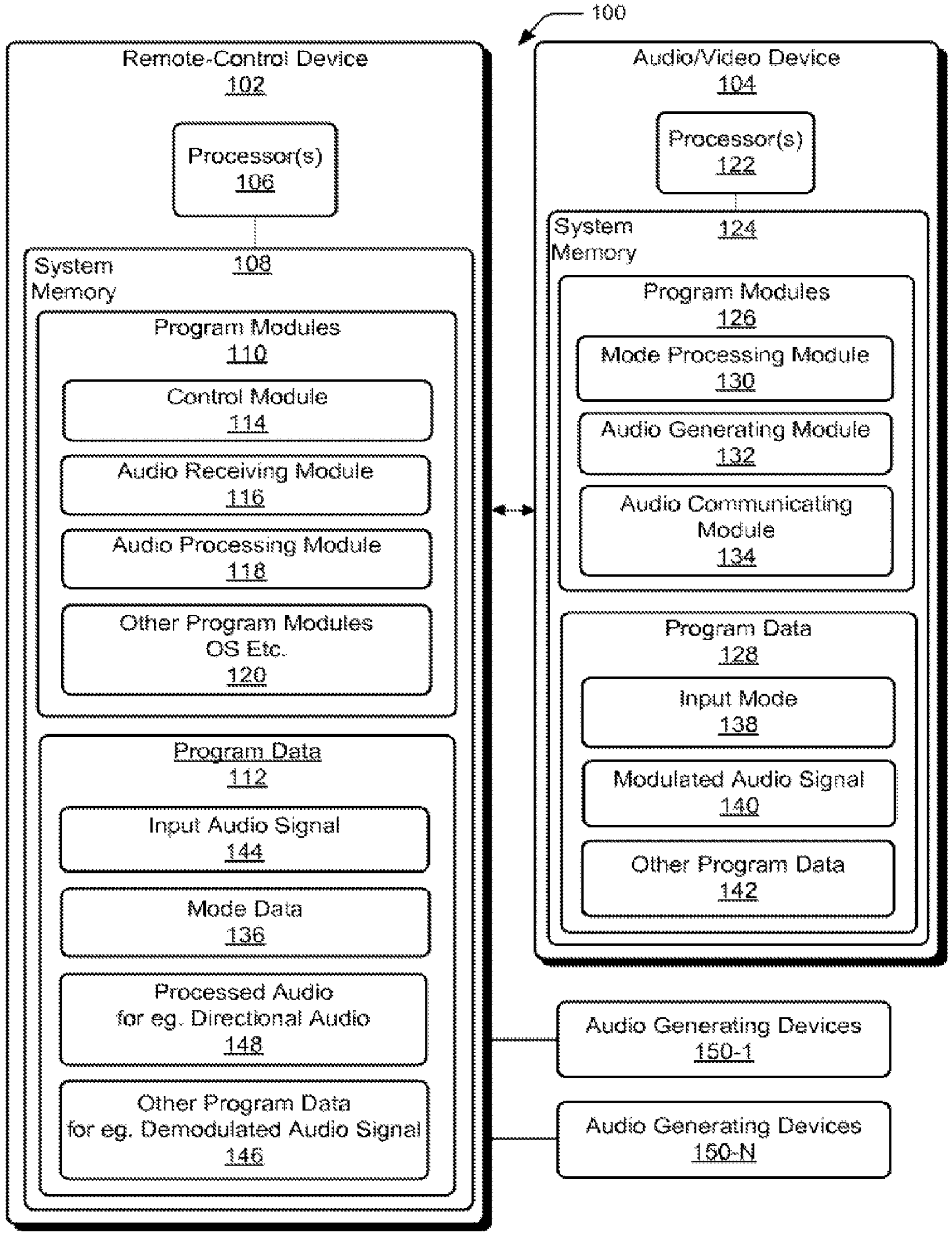
FIG. 1. shows an exemplary system for directional audio generation by a remote-control device, according to one embodiment.

Systems and methods for directing an audio signal to an intended user through a remote-control device are described. To this end, the systems and methods enable an audio/video device to transmit the audio signal to the remote-control device. In one embodiment, the remote-control device sends a command to the audio/video device to transmit the audio signal to the remote-control device. The remote-control device then receives the audio signal and reproduces the audio signal as directional audio. Towards this end, the remote control device is combined with one or more audio generating devices that generate the directional audio. The remote-control device used may be, for example, a remote controller used for controlling the operation of the audio/video devices. The audio/video device on receipt of the command, transmits the audio signal to the remote-control device using known wireless methods, for example, Radio Frequency (RF), Infrared, Wireless Fidelity (WiFi), Bluetooth, Zigbee, or other wireless network protocols.

The audio generating devices process the audio signal to generate the directional or localized audio. The directional audio is targeted at the intended recipient or a user of the remote-control device. In such a scenario, the user can carry the remote-control device to move around so that the user receives uninterrupted audio. In one implementation, the remote-control device may also be used to mute the speakers connected to the audio/video device so that the audio becomes inaudible to others in the vicinity of the audio/video device. In one implementation, the audio generating devices in the remote-control device also include mechanisms to deliver the audio through an earphone, headphone, etc. In another implementation, the remote-control device includes a storage medium in which files for playback, for example, audio or video files, are stored for playback at later time.

In one implementation, the audio generating devices may be one or more directional speakers. Directional speakers employing ultrasonic sound beams, like Audio Spotlight™ from Holosonic Research Labs and Hypersonic™ Sound System (HSS™) from American Technology Corporation, are commonly available. Similar directional speakers and their working are also described in U.S. Pat. No. 4,823,908 (Tanaka, et al.). The patent describes the manner in which the generation of directional audio signals takes place using directional speakers. For this, the directional speakers utilize the nonlinear effects of the medium through which the audio signals propagate. Such interactions between audio signals and the medium are called parametric interactions. These interactions occur when two finite amplitude sound waves having slightly different frequencies are transmitted simultaneously in a medium. The interactions due to the nonlinear effect of the medium produce a sound wave which is a combination of a wave frequency equal to the sum of the frequencies of the two transmitted waves and a wave of frequency equal to a difference of the frequencies of the two transmitted sound waves. Accordingly, if the two original sound waves are ultrasonic waves and the difference between their frequencies is so selected as to be an audio frequency, an audible sound would be generated as result of the parametric interaction. The audible sound thus generated is directional as the carrier frequency used is of ultrasonic frequency.

In a further alternative embodiment, one or more directional audio speakers are in communication with or coupled to the audio/video device. On receipt of the command from the remote control device which, inter alia, includes data indicating approximate location of the remote control device relative to the audio/video device and/or directional audio speakers, at a least a portion of the directional audio speakers are controlled to transmit audio substantially local to the approximate location of the remote control device.

These and other aspects for remote-control directional audio are now described in greater detail.

FIG. 1 shows an exemplary system 100 for generating directional audio by a remote-control device according to one embodiment. The system 100 includes a remote-control device 102, for example, a remote controller, a mobile phone, a game controller or a remote-control of an audio/video player. The remote-control device 102 is coupled to an audio/video device 104 which processes both audio as well as video signals. In one implementation, the remote-control device 102 communicates via wireless signals with the audio/video device 104.

The remote-control device 102 includes processor(s) 106 coupled to a system memory 108. The processor(s) 106 may be microprocessors, microcomputers, microcontrollers, digital signal processors, multi-core processors, etc. The procesor (s) 106 are configured to find and execute program instructions stored in the system memory 108. The system memory 108 includes both volatile random access memory (for example, RAM) and non-volatile read-only memory (for example, ROM and flash memory). The system memory 108 comprises program modules 110 and program data 112. The program modules 110 include a control module 114, an audio receiving module 116, an audio processing module 118, and other program modules 120. The other program modules 120 include, for example, an operating system (OS) to provide runtime environment and support for the working of various modules of the present system.

The remote-control device 102 receives an input audio signal from the audio/video device 104. The audio/video device 104 may include, for example, a television, a music system, a home theater, a radio, a transistor, a DVD player, a VCD player, or a VCR. The audio/video device 104 includes processor(s) 122 coupled to a system memory 124. The processor(s) 122 may be, for example, microprocessors, microcomputers, microcontrollers, digital signal processors, or multi-core processors. The processor(s) 122 are configured to find and execute program instructions stored in the system memory 124. The system memory 124 includes both, volatile random access memory (for example, RAM) and non-volatile read-only memory (for example, ROM and flash memory). The system memory 124 comprises program modules 126 and program data 128. The program modules 126 include a mode processing module 130, an audio generating module 132, and an audio communicating module 134.

The audio/video device 104 receives a command from the remote-control device 102 to generate directional audio through the remote-control device 102. In one implementation, the remote-control device 102 sends the command once a user activates a switch provided in the remote-control device 102. The user may trigger the command using any user interface provided by the remote-control device 102. The command may include a desired mode of operation of the audio/video device 104 and instructions to operate the audio/video device 104 in the desired mode. The desired mode includes sending directional audio to intended recipients from the remote-control device 102. The desired mode can be selected from mode data 136 stored in the program data 112 of the remote-control device 102. The mode data 136 includes plurality of modes of operation of the audio/video device 104, such as transmitting audio to the intended users through speakers provided in the remote-control device 102, muting speakers of the audio/video device 104, and simultaneously generating audio from speakers of the remote-control device 102 and the audio/video device 104.

The mode data 136 is processed by the control module 114 to identify the desired mode. The control module 114 sends the desired mode along with the command to the audio/video device 104. The mode processing module 130 in the audio/video device 104 examines the command received as an input mode 138 to identify the desired mode. The mode processing module 130 instructs the audio generating module 132 also in the audio/video device 104 to produce a modulated audio signal 140, according to the desired mode. In one implementation, the audio signal is modulated with a carrier wave, when properties may be stored in other program data 142. The mode processing module 130 further transmits the modulated audio signal 140 to the audio communicating module 134 also in the audio/video device 104. The audio communicating module 134 transmits the modulated audio signal 140 to the remote-control device 102 using known wireless transmission technologies, for example, Digital Infrared Audio Transmission (DIAT), RF, Infrared, WiFi, Bluetooth, Zigbee, or other wireless network protocols.

The modulated audio signal 140 is received by the audio receiving module 116 of the remote-control device 102 as an input audio signal 144. The audio receiving module 116 sends the input audio signal 144 to the audio processing module 118 also in the remote-control device 102. The audio processing module 118 processes the input audio signal 144 to produce a demodulated audio signal, shown as a form of other program data 146.

In one implementation, the audio processing module 118 processes the demodulated audio signal with an ultrasonic carrier wave to generate a processed audio 148 which can be, for example, a directional audio focused in a particular direction. It would be noted that the audio processing module 118 resides in one or more audio generating devices 150 (for example, 150-1 to 150-N) integrated with the remote-control device 102. The processed audio 148 is then communicated to the intended recipients by the audio generating device(s) 150. The audio generating devices 150 may include, for example, directional speakers.

In another embodiment, the audio generating devices 150 have mechanisms to deliver the audio through audio transmitting devices like ear phones and head phones. It would be noted that the modulated audio signal 140 from the audio/video device 104 may be simultaneously transmitted through conventional speakers attached to the audio/video device 104 and through the audio generating devices 150. In an exemplary implementation, the user may mute the conventional speakers and allow the audio to be sent only through the audio generating devices 150.

Figure 2:
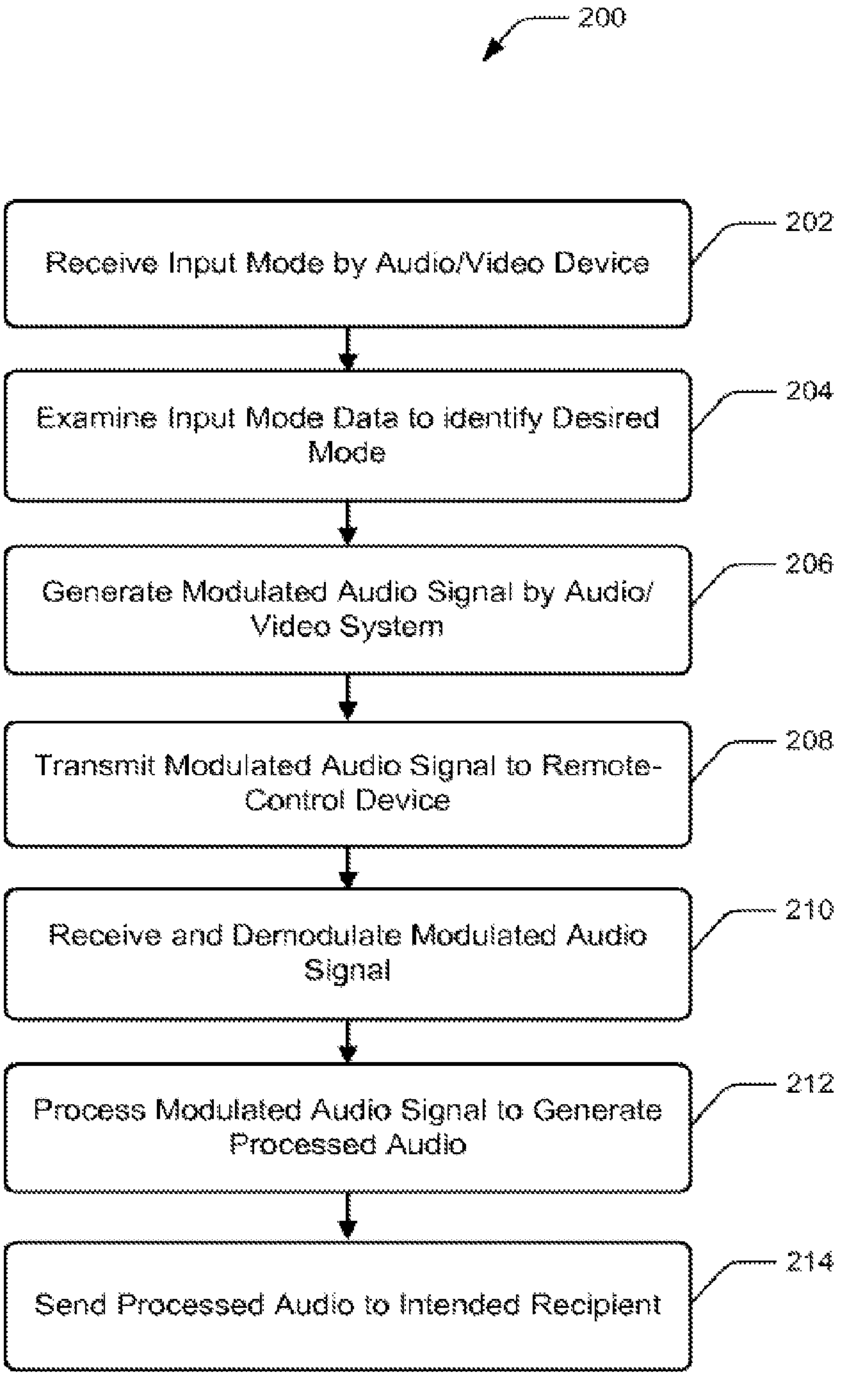
FIG. 2. shows an exemplary procedure for generating directional audio by a remote-control device.

FIG. 2 shows an exemplary procedure 200 for generating directional audio, according to one embodiment. For the purposes of exemplary illustration and description, the operations of the procedure 200 are described with respect to components of FIG. 1, although the exemplary operations of the procedure 200 are not limited to such components and/or architecture.

At block 202, a command, i.e., an input mode to select a mode of operation, is received at the audio/video device. For example, the audio/video device 104 receives the input mode 138 from the remote-control device 102. In one implementation, the input mode 138 is sent when a user activates a switch in the remote-control device 102.

At block 204, in one implementation, the audio/video device 104 examines the input mode 138 to identify the desired mode of operation of the audio/video device 104. Pursuant to identifying the desired mode, the audio/video device 104 can decide whether a change in the present mode of operation of the audio/video device 104 is required. If a change is needed, then the audio/video device 104 can change its present mode of operation to the desired mode. The desired mode may include sending an audio signal to the remote-control device 102. Alternately, if a change is not needed, then the audio/video device 104 can continue to operate in the present mode.

At block 206, in one implementation, the audio/video device 104 processes an audio signal to generate the modulated audio signal 140. The audio signal may include, for example, any audio signal associated with television broadcasts, movies played from storage media, live broadcasts, telecasted interviews, and music. In one implementation, the audio generating module 132 modulates the audio signal along with a carrier wave, resulting in the modulated audio signal 140.

At block 208, the modulated audio signal is transmitted to the remote-control device. For example, audio communicating module 134 sends the modulated audio signal 140 to the remote-control device 102 through a wireless network.

At block 210, the modulated audio signal is received by the remote-control device and demodulated to generate demodulated audio signal. For example, the remote-control device 102 receives the modulated audio signal 140 as the input audio signal 144. The input audio signal 144 is processed by the audio processing module 118 and is then demodulated to produce a demodulated audio signal.

At block 212, the demodulated audio signal is further processed to produce a processed audio which can be, for example, directional audio. For example, the audio processing module 118 modulates the demodulated audio signal (shown as a part of other program data 146) with ultrasonic waves to generate processed audio 148. The processed audio 148 may be directional audio, i.e., may have directional characteristics.

At block 214, the processed audio is transmitted to the intended recipient. For example, the audio processing module 134 residing in the audio generating devices 150 (150-1 to 150-N) receives and sends the processed audio 148 to the intended user. In another implementation, the processed audio 148 is received by a user stationed remote to the audio/video device 104.

CONCLUSION

Although systems and methods for generating a remote-control directional audio have been described in language specific to structural features and/or methodological operations or actions, it is understood that the implementations defined in the appended claims are not necessarily limited to the specific features or actions described. Rather, the specific features and operations presented with respect to FIGS. 1 and 2 are disclosed as exemplary forms of implementing the claimed subject matter.

We claim:

1. A method for generating a localized audio by a remote-control device combined with an audio generating device, the method comprising:

transmitting, by the remote-control device, data indicating an approximate location of the remote-control device relative to an audio/video device; and receiving, by the remote-control device, a directional audio signal generated by the audio/video device, where the directional audio signal is audible at the approximate location of the remote control device and inaudible at locations other than the approximate location of the remote control device, where the audio/video device generates the directional audio signal in response to a command from the remote-control device.

2. The method of claim 1, wherein the command identifies a mode of operation of the audio/video device.

3. The method of claim 2, wherein the mode of operation includes muting one or more speakers coupled to the audio/video device.

4. The method of claim 2, wherein the command is sent by the remote-control device when the mode of operation is selected by a user.

5. The method of claim 4, wherein the mode of operation is selectable through a user interface.

6. The method of claim 2, wherein the command initiates a change from a current mode of operation to the mode of operation identified by the command.

7. The method of claim 1, further comprising determining, by the remote-control device, the approximate location of the remote-control device relative to the audio/video device.

8. A system, comprising:

an audio/video device; and a remote-control device in communication with an audio generating device configured to generate directional audio, the remote-control device configured to:

transmit data indicating an approximate location of the remote-control device relative to the audio/video device; and receive a directional audio signal generated by the audio/video device, where the directional audio signal is audible at the approximate location of the remote control device and inaudible at locations other than the approximate location of the remote control device, where the audio/video device generates the directional audio signal in response to a command from the remote-control device.

9. The system of claim 8, wherein the command identifies a mode of operation of the audio/video device.

10. The system of claim 8, wherein the remote-control device is further configured to determine the approximate location of the remote-control device relative to the audio/video device.

11. The system of claim 8, wherein the audio generating device is integrated with the remote-control device.

12. The system of claim 8, wherein the remote-control device comprises one of: a remote controller, a mobile phone, a game controller or a remote-control of an audio/video player.

13. The system of claim 8, wherein the audio/video device comprises one of: a television, a radio, a home theater or a music system.

14. The system of claim 8, wherein the remote-control device is further configured to determine the approximate location of the remote-control device relative to the audio/video device.

15. A remote-control device, comprising:

processing circuitry configured to transmit data indicating an approximate location of the remote-control device relative to an audio/video device; and the processing circuitry further configured to receive a directional audio signal generated by the audio/video device, where the directional audio signal is audible at the approximate location of the remote control device and inaudible at locations other than the approximate location of the remote control device, where the audio/ video device generates the directional audio signal in response to a command from the remote-control device.

16. The remote-control device of claim 15, wherein the processing circuitry is further configured to determine the approximate location of the remote-control device relative to the audio/video device.

17. The remote-control device of claim 15, wherein the command identifies a mode of operation of the audio/video device.

18. The remote-control device of claim 17, wherein the mode of operation is selected through an user interface of the remote-control device.

19. The remote-control device of claim 15, further comprising an audio generating device configured to generate directional audio.

20. The remote-control device of claim 15, wherein the remote-control device comprises one of: a remote controller, a mobile phone, a game controller or a remote-control of an audio/video player.

* * * * *